(12) United States Patent
Harvey

(10) Patent No.: US 11,761,448 B2
(45) Date of Patent: Sep. 19, 2023

(54) AIRCRAFT PROPULSION SYSTEM

(71) Applicant: ROLLS-ROYCE plc, London (GB)

(72) Inventor: Giles E Harvey, Derby (GB)

(73) Assignee: Rolls-Royce plc

( * ) Notice: Subject to any disclaimer, the term of this patent is extended or adjusted under 35 U.S.C. 154(b) by 1181 days.

(21) Appl. No.: 16/395,996

(22) Filed: Apr. 26, 2019

(65) Prior Publication Data

US 2019/0345949 A1 Nov. 14, 2019

(30) Foreign Application Priority Data

May 14, 2018 (GB) ...................................... 1807773

(51) Int. Cl.
*F04D 25/06* (2006.01)
*B64D 27/24* (2006.01)
*B64D 35/02* (2006.01)

(52) U.S. Cl.
CPC .............. *F04D 25/06* (2013.01); *B64D 27/24* (2013.01); *B64D 35/02* (2013.01)

(58) Field of Classification Search
CPC .......... B64D 27/24; B64D 35/02; F04D 25/06
See application file for complete search history.

(56) References Cited

U.S. PATENT DOCUMENTS

| | | | |
|---|---|---|---|
| 3,678,306 A * | 7/1972 | Garnier ..................... | F02C 7/04 417/406 |
| 5,183,222 A * | 2/1993 | Ramsey, Jr. .......... | H01M 50/50 310/67 R |
| 8,099,944 B2 * | 1/2012 | Foster .................... | B64D 31/04 60/788 |
| 10,107,196 B2 * | 10/2018 | Devine .................. | F02K 3/077 |
| 10,259,573 B2 * | 4/2019 | Cai ......................... | B64C 13/50 |
| 10,392,120 B2 * | 8/2019 | Niergarth ................. | F02K 3/04 |
| 10,407,178 B2 * | 9/2019 | Regev .................... | B64D 35/02 |
| 10,814,991 B2 * | 10/2020 | Shah ..................... | B64D 27/24 |
| 2008/0089786 A1 * | 4/2008 | Sinreich .................. | B63H 5/10 416/129 |
| 2011/0108663 A1 * | 5/2011 | Westenberger ........ | B64D 27/02 123/200 |
| 2014/0248168 A1 | 9/2014 | Chantriaux et al. | |
| 2016/0176533 A1 | 6/2016 | Cazals et al. | |

(Continued)

OTHER PUBLICATIONS

NASA—Selection of Electric Motors for Aerospace Applications (Year: 1999).*

(Continued)

*Primary Examiner* — Nicholas McFall
*Assistant Examiner* — Marisa V Conlon
(74) *Attorney, Agent, or Firm* — Barnes & Thornburg LLP

(57) ABSTRACT

The present disclosure concerns an electric aircraft propulsion system. Example embodiments include an aircraft propulsion system (200) comprising: a fan (213) mounted on a central shaft (214); a first electric motor (215) mounted on the central shaft (214) and arranged to drive rotation of the fan (213) via the central shaft; and a second electric motor (216) arranged to drive rotation of the fan (213) via the central shaft (214), wherein the second electric motor (216) is coaxially mounted downstream of the first electric motor (215) and an outer diameter (D2) of the second electric motor (216) is smaller than an outer diameter (D1) of the first electric motor (215).

19 Claims, 2 Drawing Sheets

(56) References Cited

U.S. PATENT DOCUMENTS

2017/0174337 A1  6/2017  Roberts et al.
2017/0190435 A1  7/2017  Kobayashi et al.

OTHER PUBLICATIONS

Extended EP Search Report completed on Aug. 7, 2019 and issued in connection with EP Appln. No. 1916145.0.
Great Britain search report dated Nov. 9, 2018, issued in GB Patent Application No. 1807773.5.

* cited by examiner

AIRCRAFT PROPULSION SYSTEM

CROSS-REFERENCE TO RELATED APPLICATIONS

This application is based upon and claims the benefit of priority from British Patent Application Number 1807773.5 filed 14 May 2018, the entire contents of which are herein incorporated by reference.

BACKGROUND

Field of Invention

This disclosure relates to an electric aircraft propulsion system.

Description of Related Art

Conventional aircraft propulsion systems such as those based around gas turbine engines rely wholly on combustion of fuel to drive all propulsive components of the aircraft. A general aim in developing such engines further is to improve their overall fuel efficiency.

Electric motors are a possible alternative to gas turbines for aircraft propulsion, and are increasingly being used for smaller aircraft such as unmanned drones and some prototype scale manned vehicles. Further developments are, however, required before electric motors could be used in larger scale aircraft such as those conventionally powered by gas turbine engines.

SUMMARY

The disclosure is directed towards aircraft propulsion systems, and aircraft incorporating the same.

In one aspect there is provided an aircraft propulsion system comprising:

a fan mounted on a central shaft;

a first electric motor mounted on the central shaft and arranged to drive rotation of the fan via the central shaft; and a second electric motor arranged to drive rotation of the fan via the central shaft, wherein the second electric motor is coaxially mounted downstream of the first electric motor, and an outer diameter of the second electric motor may be smaller than an outer diameter of the first electric motor.

An advantage of axially staggering first and second electric motors to drive the fan is that power can be delivered to the fan in a way that allows the motors to take up a smaller overall diameter. Making the second motor smaller allows it to fit at least partially within a tail cone portion, or reduced diameter inner fairing, of the engine, further enabling the outer nacelle to be made smaller. Together, this allows the overall diameter of an engine, particularly the nacelle outlet, to be smaller, allowing the engine to be held closer to a wing, reducing the moment on the wing when being driven. The smaller diameter of the motors may alternatively allow a larger diameter fan for the same ground clearance, and additionally or alternatively an increased ground clearance for the same diameter fan. A further advantage is that splitting the power sources for driving the fan by using more than one electric motor allows for improved cooling as the configuration allows for greater access and may reduce temperature rises compared to a system with a single motor.

The outer diameter of the second electric motor may for example be between 0.4 and 0.8 of the outer diameter of the first electric motor.

A power rating of the second electric motor may be the same or less than a power rating of the first electric motor. The power rating of the second electric motor may for example be between 0.25 and 0.5 times the power rating of the first electric motor, where for example both motors are arranged to drive the central shaft at the same speed. With both the first and second electric motors operating to drive the fan, the second electric motor may contribute between 0.2 and 0.33 of an overall power supplied to the fan.

The second electric motor may be mounted to the central shaft and arranged to drive the central shaft at the same rotational speed as the first electric motor. Alternatively, the system may comprise a gearbox connected between the central shaft and the second electric motor such that the second electric motor drives at a higher rotational speed than the central shaft. The higher rotational speed of the second electric motor, corresponding to the gearing ratio of the gearbox, may be at least twice the rotational speed of the central shaft, and may be up to five times the rotational speed of the central shaft. The gearbox may for example have a planetary or star gearing arrangement.

In some examples a clutch may be arranged to engage or disengage the first and/or second electric motors from the central shaft. An advantage of using a clutch is firstly to reduce power losses through heating of the gearbox when the second motor is not operational, and secondly to allow one of the motors to be disengaged in the event of failure, preventing overheating.

In another aspect there is provided an aircraft comprising one or more engines, each engine being according to the first aspect.

Each engine may be mounted to a wing of the aircraft, or alternatively may be mounted to the fuselage or tailplane of the aircraft.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
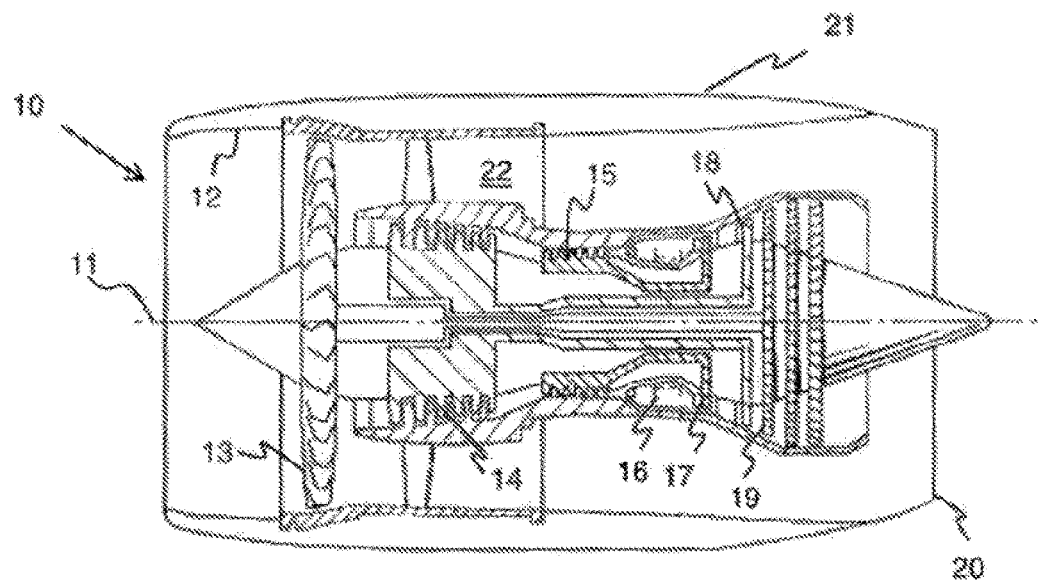
FIG. 1 is a schematic sectional side view of a prior turbofan engine.

With reference to FIG. 1, a prior turbofan engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
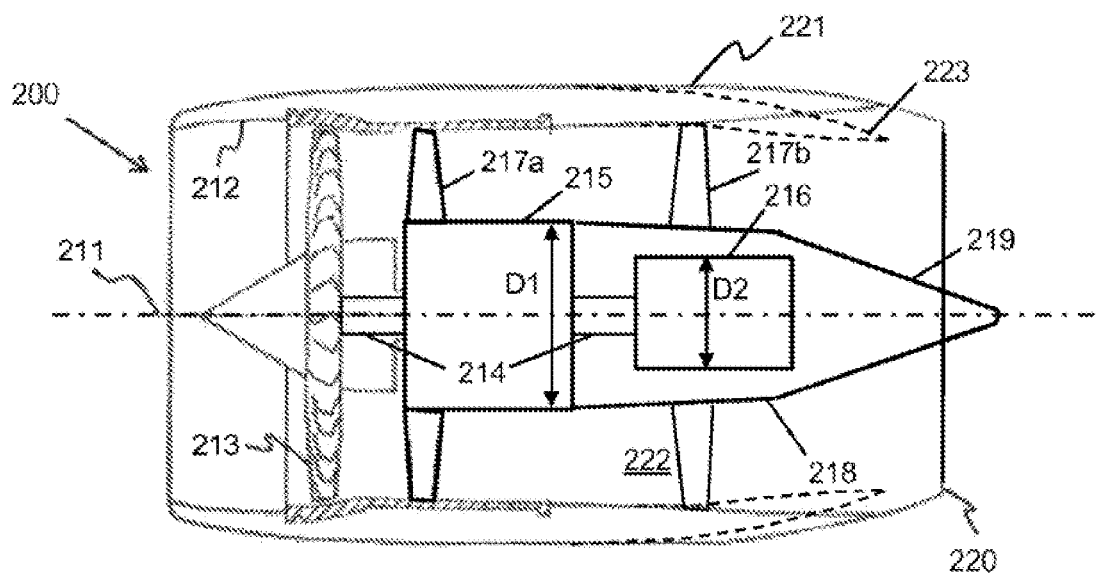
FIG. 2 is a schematic sectional side view of an electric aircraft propulsion system.

A schematic illustration of an example of an aircraft propulsion system, or engine, 200 according to the present disclosure is shown in FIG. 2. As with the gas turbine engine 10 of FIG. 1, the system 200 comprises a nacelle 221 defining an intake 212 and an outlet nozzle 220. A propulsive fan 213 is mounted for rotation about a central axis 211, the fan 213 being mounted on a central shaft 214.

Instead of being powered by a gas turbine engine, the fan 213 of the propulsion system 200 is driven by a first electric motor 215, which is also mounted on the central shaft 214 coaxially with the fan 213. The first electric motor 215 is centrally mounted within the nacelle 221 via structural supports 217 crossing a passage 222 through which air driven by the fan 213 passes through to the outlet 220 surrounding a tail cone 219.

A second electric motor 216 is also mounted coaxially to the central shaft 214, and provides additional power to drive the fan 213. In the illustrated example, the second electric motor 216 is arranged to drive the central shaft 214 simultaneously and at the same rotational speed as the first electric motor 215.

An outer diameter D1 of the first electric motor 215 is greater than an outer diameter D2 of the second electric motor 216. This permits the second electric motor to fit within a smaller space downstream of the first electric motor 215. In an embodiment the second electric motor may be located at least partially within the internal space of the tail cone 219. In an embodiment the second electric motor 216 may for example have an outer diameter of between 0.4 and 0.8 of the outer diameter of the first electric motor 215.

A power rating of the first and second electric motors 215, 216 may be different, with the second electric motor 216 optionally having a lower power rating than the first electric motor 215. The second electric motor 216 may for example have a power rating of between 0.25 and 0.5 that of the first electric motor 215. As a proportion of the total power of the system 200, with both electric motors 215, 216 operating simultaneously, the second electric motor 216 may contribute between one fifth and one third, while the first electric motor 215 contributes between four fifths and two thirds of the total power. For example, for a total power of around 70 megawatts, the first motor may be rated at around 53 megawatts and the second motor around 17 megawatts. A maximum electric motor diameter in such a case may be around 1.4 metres. For a smaller engine, for example delivering a power of around 350 kilowatts, a maximum diameter for the electric motor may be around 0.5 metres.

The smaller size of the second electric motor 216 enables the outlet end of the nacelle 221 to be made smaller in diameter than would otherwise be possible. This is shown schematically in FIG. 2, where the dotted line 223 indicates a possible alternative form of nacelle outlet shape. Reducing the outlet size of the nacelle 221 enables the engine 200 to be positioned with its centre of gravity closer to the wing, reducing a bending moment felt by the pylon and the wing due to the weight of the engine.

Figure 3:
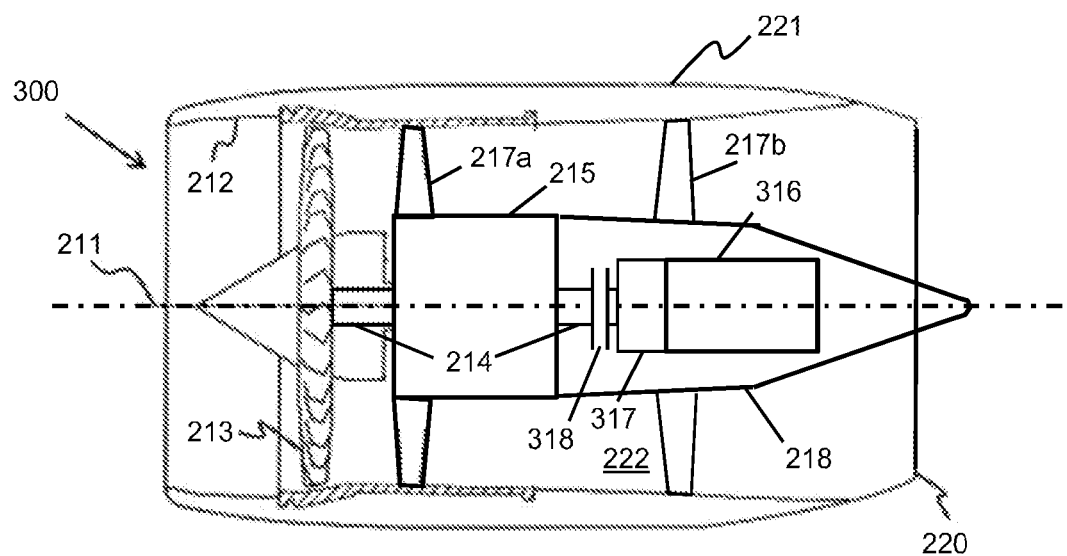
FIG. 3 is a schematic sectional side view of an alternative example aircraft propulsion system.

FIG. 3 illustrates an alternative example of an aircraft propulsion system 300, in which commonly numbered parts serve the same function as those illustrated in FIG. 2. In this alternative example, the second electric motor 316 is connected to the central shaft 214 via a gearbox 317. The gearbox has an input to output ratio that allows the output of the second electric motor 316 to be at a higher rotational speed than that of the central shaft. The input to output ratio may for example be at least 2:1 and may in a specific example be 3:1. In general, the gearbox 317 may have a ratio of between 2 and 5. The gearbox may for example have a planetary or star arrangement of gears. In a planetary arrangement, the second electric motor 317 may be connected to the sun gear, while the central shaft 214 is connected to a carrier of the planetary gears, with the outer ring fixed.

In a specific example that may be applicable to an engine for a passenger aircraft, the first electric motor may have a power rating of 3.4 megawatts, and the second electric motor a similar power rating. The first electric motor may operate at 6,500 rpm, while the second electric motor, having a smaller size, may operate, via a gearbox with a ratio of 3:1, at 19,500 rpm.

In some examples, a clutch 318 may be provided to engage or disengage the second electric motor 316 from the central shaft 214. In the example illustrated in FIG. 3, the clutch is provided between the central shaft 214 and the gearbox 317. An advantage of this arrangement is that, when the second electric motor 316 is not required (for example while the aircraft is at cruise), it can be disengaged from the fan 213 to reduce losses through the gearbox and through rotating the second electric motor 316 without providing power to the fan 213. A clutch in this position may also work more favourably for a faster machine as torque reduces for higher speeds at the same power, and the amount of torque will dictate the size of the clutch and transmission features.

In alternative arrangements, a clutch may alternatively or additionally be provided between the central shaft 214 and the first electric motor 215, enabling the first electric motor 215 to be engaged or disengaged depending on the amount of power required. A clutch may also be used to disengage one of the motors 215, 216 in the event of failure, such that a remaining motor can be used to continue supplying power to the fan 213 to allow the aircraft to land safely and avoid overheating of the failed motor.

In examples where a gearbox 317 is used, the second electric motor 316 will operate at a higher rotational speed than the first electric motor 315, depending on the gearing ratio of the gearbox 317. The gearing ratio may for example be between 2 and 5, i.e. the second electric motor 317 will operate at around twice to five times the rotational speed of the first electric motor 215. As a result, the second electric motor 316 may be made smaller while still providing the same or similar amount of power to the fan 213 as the first electric motor 215. The outer diameter of the second electric motor 316 may in some cases be around two thirds of that of the first electric motor 215, and in general may be between 0.4 and 0.8 the outer diameter of the first electric motor 215.

In some cases one of more further electric motors may be provided, each of which is mounted coaxially with the first and second electric motors 215, 216/316. The limit to the number of motors will be the capacity to accommodate them within the interior of the engine 200/300.

Figure 4:
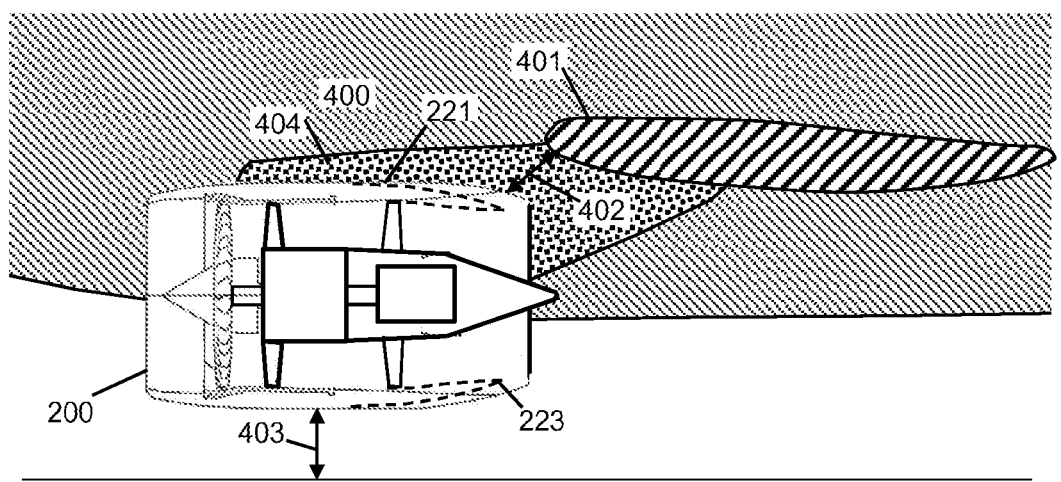
FIG. 4 is a schematic sectional side view of a propulsion system attached to an aircraft wing.

FIG. 4 illustrates schematically an aircraft 400 having a propulsion system, or engine, 200 of the type described herein mounted to a wing 401 of the aircraft 400. A shortest distance 402 between the wing 401 and the nacelle 221 of the engine 200 is determined by the outer diameter of the nacelle outlet end. An alternative form of nacelle outlet 223, enabled by the smaller diameter of the electric motor components of the engine 200, allows the engine to be mounted closer to the wing 401 while retaining the same distance 402 between the engine 200 and the wing 401. A benefit of this is a reduced moment on the wing 401 and pylon 404, allowing design criteria for stiffness and strength of the wing and pylon to be relaxed. A ground clearance 403 may also be increased by reducing the overall size of the nacelle 221, or alternatively having the same ground clearance with a larger fan. The propulsion system 200 may in other examples be mounted to the fuselage or tailplane of the aircraft.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. An aircraft propulsion system comprising:
   a fan mounted on a central shaft;
   a first electric motor mounted on the central shaft and arranged to drive rotation of the fan via the central shaft;
   a tail cone arranged axially spaced apart from and downstream of the first electric motor; and
   a second electric motor arranged to drive rotation of the fan via the central shaft,
   wherein the second electric motor is coaxially mounted downstream of the first electric motor, and an outer diameter (D2) of the second electric motor is smaller than an outer diameter (D1) of the first electric motor, and
   wherein air driven by the fan passes through an outlet of the air propulsion system downstream of the first electric motor, wherein the tail cone at least partially defines the outlet such that the outlet at least partially surrounds the tail cone, and wherein the second electric motor is at least partially arranged within an interior of the tail cone.

2. The aircraft propulsion system of claim 1 wherein the outer diameter (D2) of the second electric motor is between 0.4 and 0.8 of the outer diameter (D1) of the first electric motor.

3. The aircraft propulsion system of claim 1 wherein a power rating of the second electric motor is less than a power rating of the first electric motor.

4. The aircraft propulsion system of claim 3 wherein the power rating of the second electric motor is between 0.25 and 0.5 times the power rating of the first electric motor.

5. The aircraft propulsion system of claim 3 wherein, with both the first and second electric motors operating to drive the fan, the second electric motor contributes between 0.2 and 0.33 of an overall power supplied to the fan.

6. The aircraft propulsion system of claim 1 wherein the second electric motor is directly mounted to the central shaft and arranged to drive the central shaft at the same rotational speed as the first electric motor.

7. The aircraft propulsion system of claim 1 comprising a gearbox connected between the central shaft and the second electric motor such that the second electric motor is arranged to drive the central shaft at a higher rotational speed than that of the central shaft, wherein the gearbox has a gearing ratio of between 2 and 5.

8. The aircraft propulsion system of claim 7 wherein the gearbox has a planetary or star gearing arrangement.

9. The aircraft propulsion system of claim 1 comprising a clutch arranged to engage or disengage the first and/or second electric motors from the central shaft.

10. The aircraft propulsion system of claim 1, further comprising:
    a nacelle surrounding the fan, the first electric motor, and the second electric motor and defining the outlet at an axially aft end of the nacelle;
    an inner annular wall arranged radially inward of the nacelle, wherein the nacelle and the inner annular wall define a passage through which air driven by the fan passes, wherein the air is driven by the fan, past the first and second electric motors, and to the outlet of the nacelle, wherein the inner annular wall defines the tail cone downstream of the first electric motor; and
    at least one structural support extending radially inwardly from the nacelle and supporting the first electric motor and the inner annular wall.

11. The aircraft propulsion system of claim 10, wherein the inner annular wall includes a transition location located axially upstream of an axially aft end of the second electric motor and defining a first diameter, wherein the inner annular wall includes a terminal end at an axially aft end of the tail cone, the terminal end defining a second diameter, and wherein the inner annular wall is sloped between the transition location and the terminal end so as to define the tail cone.

12. An aircraft comprising one or more engines, each engine comprising:
    a fan mounted on a central shaft;
    a first electric motor mounted on the central shaft and arranged to drive rotation of the fan via the central shaft;
    a tail cone arranged axially spaced apart from and downstream of the first electric motor; and
    a second electric motor arranged to drive rotation of the fan via the central shaft,
    wherein the second electric motor is coaxially mounted downstream of the first electric motor, and an outer diameter (D2) of the second electric motor is smaller than an outer diameter (D1) of the first electric motor, and
    wherein air driven by the fan passes through an outlet of the air propulsion system downstream of the first electric motor, wherein the tail cone at least partially defines the outlet such that the outlet at least partially surrounds the tail cone, and wherein the second electric motor is at least partially arranged within an interior of the tail cone.

13. The aircraft propulsion system of claim 12 wherein the outer diameter (D2) of the second electric motor is between 0.4 and 0.8 of the outer diameter (D1) of the first electric motor.

14. The aircraft propulsion system of claim 12 wherein a power rating of the second electric motor is less than a power rating of the first electric motor.

15. The aircraft propulsion system of claim 14 wherein the power rating of the second electric motor is between 0.25 and 0.5 times the power rating of the first electric motor.

16. The aircraft propulsion system of claim 14 wherein, with both the first and second electric motors operating to drive the fan, the second electric motor contributes between 0.2 and 0.33 of an overall power supplied to the fan.

17. The aircraft propulsion system of claim 12 wherein the second electric motor is directly mounted to the central shaft and arranged to drive the central shaft at the same rotational speed as the first electric motor.

18. The aircraft propulsion system of claim 12 comprising a gearbox connected between the central shaft and the second electric motor such that the second electric motor is arranged to drive the central shaft at a higher rotational speed than that of the central shaft, wherein the gearbox has a gearing ratio of between 2 and 5, and wherein the gearbox has a planetary or star gearing arrangement.

19. The aircraft propulsion system of claim 12 comprising a clutch arranged to engage or disengage the first and/or second electric motors from the central shaft.

* * * * *